(12) United States Patent
Pigott

(10) Patent No.: US 9,667,084 B2
(45) Date of Patent: May 30, 2017

(54) WIRELESS CHARGING SYSTEMS, DEVICES, AND METHODS

(71) Applicant: John M. Pigott, Phoenix, AZ (US)

(72) Inventor: John M. Pigott, Phoenix, AZ (US)

(73) Assignee: NXP USA, INC., Austin, TX (US)

( * ) Notice: Subject to any disclaimer, the term of this patent is extended or adjusted under 35 U.S.C. 154(b) by 376 days.

(21) Appl. No.: 13/799,343

(22) Filed: Mar. 13, 2013

(65) Prior Publication Data

US 2014/0266019 A1    Sep. 18, 2014

(51) Int. Cl.
| | |
|---|---|
| H02J 7/00 | (2006.01) |
| H02J 7/02 | (2016.01) |
| H02J 7/04 | (2006.01) |
| H04B 5/00 | (2006.01) |
| H02J 50/12 | (2016.01) |
| H02J 50/80 | (2016.01) |
| H02J 5/00 | (2016.01) |

(52) U.S. Cl.
CPC .............. *H02J 7/025* (2013.01); *H02J 7/045* (2013.01); *H02J 7/047* (2013.01); *H02J 50/12* (2016.02); *H02J 50/80* (2016.02); *H04B 5/0037* (2013.01); *H01M 2220/30* (2013.01); *H02J 5/005* (2013.01)

(58) Field of Classification Search
CPC .......... H02J 7/025; H02J 7/0068; H02J 5/005; H02J 50/00; H02J 50/10; H02J 50/80
USPC ......................................................... 320/108
See application file for complete search history.

(56) References Cited

U.S. PATENT DOCUMENTS

| | | | |
|---|---|---|---|
| 6,028,503 A * | 2/2000 | Preishuberpflugl et al. | 340/10.4 |
| 6,321,067 B1 | 11/2001 | Suga et al. | |
| 6,436,299 B1 | 8/2002 | Baarman et al. | |
| 6,975,198 B2 | 12/2005 | Baarman et al. | |
| 7,126,450 B2 | 10/2006 | Baarman et al. | |

(Continued)

FOREIGN PATENT DOCUMENTS

| | | |
|---|---|---|
| WO | 2011062097 | 5/2011 |
| WO | 2013031589 | 3/2013 |

OTHER PUBLICATIONS

EP Application No. 14158774.1-1806, partial search report dated Jul. 4, 2014.

(Continued)

*Primary Examiner* — Nathaniel Pelton
(74) *Attorney, Agent, or Firm* — Sherry W. Schumm

(57) ABSTRACT

A wireless charging system includes a power transmitting device and a power receiving device. In the transmitting device, a transmitting coil converts a drive signal from a drive signal circuit into an alternating magnetic field. In the receiving device, a receiving coil produces an alternating waveform from the magnetic field, and a rectifier rectifies the alternating waveform to deliver power having a rectified voltage. A modulation circuit causes a loading circuit to be coupled to and uncoupled from the receiving coil at a pre-determined modulation rate when, for example, the rectified voltage is greater than a threshold voltage. Back in the transmitting device, a modulation detector circuit detects modulation of the load impedance, and when the load impedance is modulating at the pre-determined modulation rate, causes the drive signal circuit to adjust a characteristic of the drive signal, resulting in an adjustment in an intensity of the magnetic field.

24 Claims, 4 Drawing Sheets

(56) References Cited

U.S. PATENT DOCUMENTS

| | | |
|---|---|---|
| 7,212,414 B2 | 5/2007 | Baarman |
| 7,233,222 B2 | 6/2007 | Baarman et al. |
| 7,355,150 B2 | 4/2008 | Baarman et al. |
| 7,385,357 B2 | 6/2008 | Kuennen et al. |
| 7,462,951 B1 | 12/2008 | Baarman |
| 7,518,267 B2 | 4/2009 | Baarman |
| 7,522,878 B2 | 4/2009 | Baarman |
| 2010/0013321 A1* | 1/2010 | Onishi et al. ................. 307/104 |
| 2010/0072825 A1* | 3/2010 | Azancot et al. ............. 307/104 |
| 2011/0169446 A1* | 7/2011 | Kondo .......................... 320/108 |
| 2011/0210620 A1* | 9/2011 | Shinoda .................. H02J 5/005 307/104 |
| 2012/0038317 A1 | 2/2012 | Miyamoto et al. |
| 2012/0235636 A1* | 9/2012 | Partovi ................... H02J 7/025 320/108 |
| 2012/0262108 A1* | 10/2012 | Olson ................... A61N 1/3787 320/108 |
| 2012/0293008 A1* | 11/2012 | Park et al. .................... 307/104 |
| 2012/0326524 A1* | 12/2012 | Matsumoto ......... H01M 10/425 307/104 |
| 2013/0026851 A1* | 1/2013 | Taguchi .............. H02J 13/0075 307/104 |
| 2013/0147279 A1* | 6/2013 | Muratov ................. H02J 5/005 307/104 |
| 2013/0214611 A1* | 8/2013 | Bae ........................ H02M 7/06 307/104 |

OTHER PUBLICATIONS

EP Application No. 14158774.1-1806/2779358, extended search report dated Oct. 24, 2014.
Baarman et al., Understanding Wireless Power, Fulton Innovation,pp. Cover, 1-13, Dec. 2009.
Baarman, Making Wireless Truly Wireless: The Need for a Universal Wireless Power Solution, Fulton Innovation, pp. Cover, 1-6, Sep. 2009.
Wireless Power Consortium, QI System Description Wireless Power Transfer, Jul. 2012, pp. 1-19,63-94.

* cited by examiner

WIRELESS CHARGING SYSTEMS, DEVICES, AND METHODS

TECHNICAL FIELD

Embodiments relate generally to systems, devices, and methods that implement wireless charging.

BACKGROUND

The convenience associated with wireless charging (or "contactless charging") of portable electronic devices has evoked extensive interest in the development of this technological area. In general, wireless charging relies on near field magnetic induction between coils. More specifically, in a system that implements wireless charging, when a power receiving device (e.g., a cellular telephone) is brought into close proximity to a power transmitting device (e.g., a wireless charging pad, table, or other surface), power is transmitted from the power transmitting device to the power receiving device through magnetic inductive coupling between coils in the devices (i.e., between the "primary coil" in the power transmitting device and a "secondary coil" in the power receiving device). An alternating current is passed through the primary coil of the power transmitting device, and that alternating current generates a time-varying magnetic field around the primary coil. When the time-varying magnetic field impinges on the secondary coil in the power receiving device, a voltage is induced in the secondary coil. Additional circuitry within the power receiving device produces an output voltage that can be used to charge a battery or otherwise power the power receiving device.

The Qi interface standards developed by the Wireless Power Consortium set forth various wireless charging specifications to promote interoperability across rechargeable electronic devices. For example, among other things, the Qi interface standard sets forth a communication protocol for a power receiving device to communicate with a power transmitting device in order to request more or less power. More particularly, the power receiving device communicates packets of control data to the power transmitting device, which include control error packets, received power packets, charge status packets, and end power transfer packets, among other possible packets. Based on the information contained within a received packet, the power transmitting device may adjust its operating point (e.g., increase or decrease the primary coil current to increase or decrease the oscillating magnetic flux enclosed by the primary coil(s), referred to as the "power signal").

The power receiving device communicates to the power transmitting device using backscatter modulation. More specifically, the power receiving device modulates the amount of power that it draws from the magnetic field impinging upon the secondary coil. The power transmitting device detects this as a modulation of the current through and/or voltage across the primary coil. In other words, the power receiving device and the power transmitting device use an amplitude modulated power signal to provide a power receiving device-to-power transmitting device communications channel.

Implementing wireless charging in accordance with the Qi interface standard is not suitable for all types of portable electronic devices. Essentially, the power receiving device must have sufficient physical size and processing power to perform the processing and modulation associated with determining a received power level and communicating with the power transmitting device using the Qi packet-based communication protocol. Accordingly, application of the Qi interface standard or other wireless charging techniques tends to be limited to systems that include relatively large or complex power receiving devices.

DETAILED DESCRIPTION

As will be described in more detail below, embodiments described herein include systems and devices that implement wireless charging, where relatively uncomplicated protocols are used to communicate between a power receiving device and a power transmitting device in order to increase or decrease the power signal conveyed by the power transmitting device. As will be explained in more detail below, the processing and communication requirements of a power receiving device may be greatly reduced, when compared with devices that implement the Qi interface standard (or similar techniques). Accordingly, embodiments of wireless charging apparatus and methods described herein may be implemented in relatively simple devices having size constraints that would make implementation of the Qi interface standard untenable.

Figure 1:
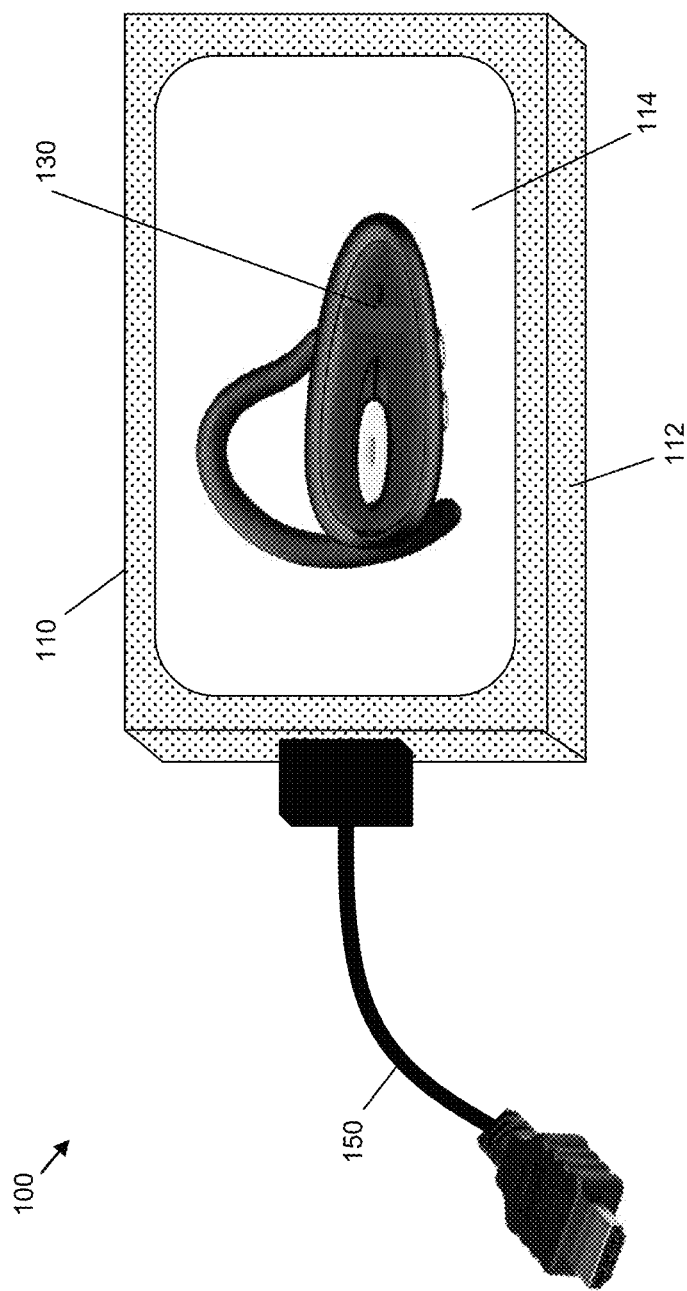
FIG. 1 depicts a system that implements wireless charging through inductive coupling between a power transmitting device and a power receiving device, according to an example embodiment.

FIG. 1 depicts a system 100 that implements wireless charging through inductive coupling between a power transmitting device 110 and a power receiving device 130, according to an example embodiment. In the illustrated example, the power transmitting device 110 is a relatively compact, discrete apparatus having a body 112 and an interface surface 114 upon which the power receiving device 130 may be placed. In alternate embodiments, the power transmitting device 110 may be integrated with a larger structure (e.g., a table, computer, automobile, and so on). In addition, although the description herein primarily discusses a power transmitting device with a single primary coil (e.g., primary coil 212, FIG. 2), alternate embodiments of a power transmitting device may include multiple primary coils that are spatially distributed with respect to an interface surface. In such alternate embodiments, one or more primary coils may be activated at any given time to provide an alternating magnetic flux from which a power receiving device may derive power (e.g., based on the position of the power receiving device on the interface surface). Such alternate embodiments are intended to be included within the scope of the inventive subject matter.

The power transmitting device 110 receives power from an external connection 150, which ultimately may be coupled with an electrical grid or other power source. For example, the power transmitting device 110 may include a Universal Serial Bus (USB) port, and the external connection 150 may be a USB cable, as illustrated in FIG. 1. As such, the power transmitting device 110 may receive power through the external connection 150, and also may send and receive signals to an external network or computing system coupled to the other end of the USB cable. In an alternate embodiment, the power transmitting device 110 may receive power from a simple power cable. In still other alternate embodiments, the power transmitting device 110 may receive power from other types of external interfaces, and/or the power transmitting device 110 may include its own self-contained power source (e.g., a battery, a generator, and so on).

The power receiving device 130 may be any of a variety of types of portable electronic devices. Although power receiving device 130 is illustrated as an "ear phone," for example, other power receiving devices may include hearing aids, wireless headphones, wireless speakers, wireless earbud devices, in-ear headphones, remote control devices, joysticks, wireless keyboards, wireless cursor control devices (mouses), watches, keyfobs, portable consumer devices, cellular telephones, tablet computers, and virtually any other portable electronic device. Various characteristics of the disclosed embodiments make application of the embodiments particularly well suited for relatively small portable electronic devices, including devices that have relatively low power requirements (e.g., 50 to 100 milliwatts (mW) or less). However, application of the various embodiments is not limited to such relatively small portable electronic devices, and/or the various embodiments may be implemented in devices having low power requirements (e.g., devices requiring >0 W to 5 W), or higher power requirements (e.g., devices requiring greater than 5 W).

As will be described in more detail below, power is transmitted from the power transmitting device 110 to the power receiving device 130 through magnetic inductive coupling between coils in the devices 110, 130. More specifically, the power transmitting device 110 includes one or more primary or "transmitting" coils (e.g., transmitting coil 212, FIG. 2), through which the power transmitting device 110 sends a time-varying drive signal (e.g., an alternating current in the form of a sinusoidal wave, a square wave, or another wave pattern). The primary coil(s) convert the drive signal into a time-varying (e.g., oscillating) magnetic field or flux around the primary coil(s), which is referred to herein as a "power signal". The power receiving device 130 includes a secondary or "receiving" coil (e.g., receiving coil 232, FIG. 2), and the power signal impinges on the secondary coil when the primary and secondary coils are in close enough physical proximity to each other.

In response to the power signal impinging on the receiving coil, the receiving coil produces an input alternating waveform or voltage. Additional circuitry within the power receiving device 130 rectifies the input voltage and produces an output voltage that can be used to charge a battery or otherwise power the power receiving device 130. According to an embodiment, the power receiving device 130 may couple and not couple a loading circuit (e.g., loading circuit 260, FIG. 2) to the receiving coil at a pre-determined modulation rate when the rectified input voltage exceeds a threshold. When the loading circuit is coupled to the receiving coil, the power receiving device 130 presents a first load impedance to the power transmitting device 110. When the loading circuit is uncoupled from the receiving coil (i.e., the loading circuit is not coupled to the receiving coil), the power receiving device 130 presents a different, second load impedance to the power transmitting device 110.

The power transmitting device 110 is configured to detect the modulation of the load impedance at the pre-determined modulation rate, in an embodiment. When the power transmitting device 110 determines that the load impedance is modulating at the pre-determined modulation rate, the power transmitting device 110 adjusts a characteristic of the time-varying drive signal applied to the transmitting coil. This, in turn, results in an adjustment in an intensity of the time-varying magnetic field emanating from the power transmitting device 110, and thus an amplitude of the regulated input voltage in the power receiving device 130. In this manner, the power receiving device 130 may control the level of power provided by the power transmitting device 110.

Figure 2:
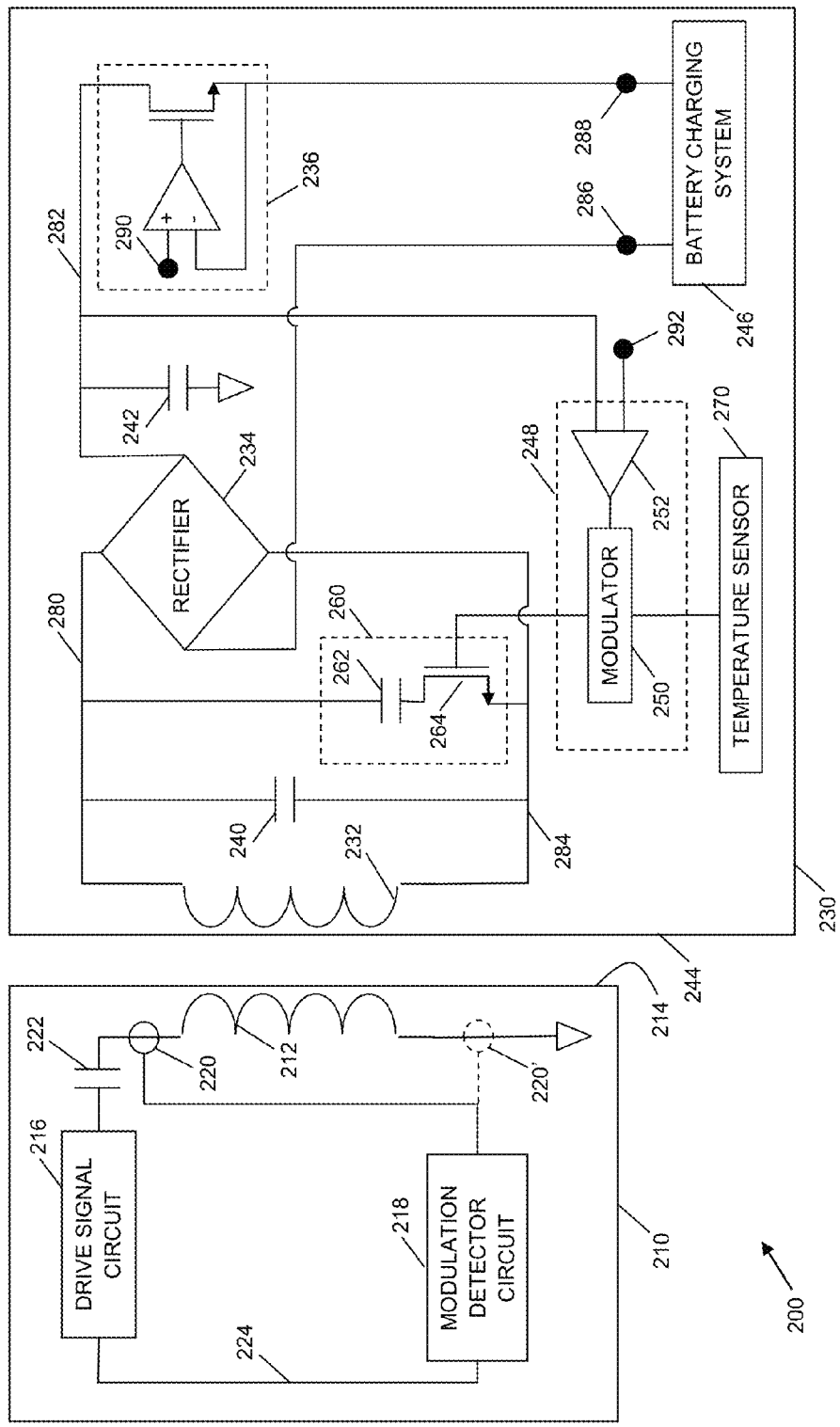
FIG. 2 illustrates a simplified schematic of a wireless charging system, according to an example embodiment.

FIG. 2 illustrates a simplified schematic of a wireless charging system 200, according to an example embodiment. Wireless charging system 200 includes a power transmitting device 210 (e.g., power transmitting device 110, FIG. 1) and a power receiving device 230 (e.g., power receiving device 130, FIG. 1). As with the system described in conjunction with FIG. 1, and as will be discussed in detail below, power is transmitted from the power transmitting device 210 to the power receiving device 230 through magnetic inductive coupling between coils 212, 232 in the devices 210, 230.

Power transmitting device 210 includes one or more transmitting coils 212, one or more drive signal circuits 216, and one or more modulation detector circuits 218, in an embodiment. According to further embodiments, power transmitting device 210 also includes one or more current sensors 220 and one or more tuning capacitors 222. Power transmitting device 210 may include additional circuitry, as well (e.g., processor(s), data storage, communications interfaces, etc.). However, such additional circuitry is not illustrated in FIG. 2 to avoid obfuscating the description of the various embodiments. In addition, although only one transmitting coil 212, drive signal circuit 214, and modulation detector circuit 216 is illustrated in FIG. 2, it is to be understood that alternate embodiments may include multiple transmitting coils 212 that are spatially distributed with respect to one or more interface surfaces (e.g., interface surface 214), along with additional drive signal circuits 216 and modulation detector circuits 218. Such embodiments are intended to be included within the scope of the inventive subject matter. However, for purposes of ease of description, a system will be described with a single transmitting coil 212, drive signal circuit 216, and modulation detector circuit 218.

According to an embodiment, power receiving device 230 includes a receiving coil 232, a rectifier 234, a loading circuit 260, and a modulation circuit 248. In addition, power receiving device 230 may include a voltage regulator 236, one or more tuning capacitors 240, one or more reservoir capacitors 242, a battery charging system 246, and a temperature sensor 270. Power receiving device 230 may include additional circuitry, as well (e.g., processor(s), data storage, communications interfaces, user interfaces, etc.). However, such additional circuitry is not illustrated in FIG. 2 to avoid obfuscating the description of the various embodiments.

As mentioned above, while the system 200 is performing a wireless charging operation, power is transmitted from the power transmitting device 210 to the power receiving device 230 through magnetic inductive coupling between coils 212, 232 in the devices 210, 230. The transmitting coil 212 is positioned in close proximity to the interior side of an interface surface 214 of the power transmitting device 210 (e.g., interface surface 114, FIG. 1), so that a time-varying magnetic field around the transmitting coil 212 (or the power signal) may emanate beyond the interface surface 214 and impinge upon a receiving coil (e.g., receiving coil 232) in another device (e.g., power receiving device 230). Similarly, the receiving coil 232 may be positioned in close proximity to an interior side of an interface surface 244 to increase the likelihood of encountering a power signal of sufficient magnitude to allow the wireless charging operation to be performed. Some types of power receiving devices 230 may be sufficiently small, however, that positioning of the receiving coil 232 near an interface surface 244 is not essential. According to an embodiment, the transmitting coil 212 and the receiving coil 232 may be tuned, using tuning capacitors 222 and 240, respectively, to provide sufficient resonance between the coils 212, 232, and to increase the amplitude of the power signal received by the power receiving device 230.

A wireless charging operation may be initiated when the power receiving device 230 is brought into close proximity to the transmitting coil 212 of the power transmitting device 210. In the power transmitting device 210, the drive signal circuit 216 is coupled with the transmitting coil 212, and the drive signal circuit 216 produces a time-varying drive signal, which is received by the transmitting coil 212. For example, the drive signal may be a sinusoidal wave, a square wave, or another type of oscillating wave. According to an embodiment, the drive signal has a frequency within a radio band that is designated for short-range, low power communications (e.g., within an Industrial, Scientific, and Medical (ISM) radio band). For example, the drive signal may have a frequency in an ISM band of between about 50 kilohertz (kHz) and 500 kHz (e.g., 125 kHz), although the drive signal may have higher or lower frequencies in other bands, as well. In addition, the duty cycle of the drive signal may be about 50 percent, according to an embodiment, although the duty cycle may be higher or lower, as well.

Initially, in an embodiment, the drive signal circuit 216 produces a drive signal that will result in a power signal with a relatively high power level (e.g., a maximum power level), so that the power transmitting device 210 provides maximum power to the power receiving device 230 upon initiation of the wireless charging operation. For example, the power transmitting device 210 initially may transmit a power signal having a maximum power in a range of about 500 milliwatts (mW) to about 2.0 W (e.g., about 1.0 W), although the maximum transmitted power signal may have higher or lower power, as well. The system 200 is less than 100 percent efficient, in terms of power transfer, and therefore the power receiving device 230 receives an attenuated version of the power signal. For example, in a system that is 50 percent efficient, the power receiving device 230 would receive about 500 mW when the power transmitting device 210 transmits a power signal of 1.0 W. In another embodiment, the initially provided drive signal may not cause the power transmitting device 210 to provide maximum power upon initiation of the wireless charging operation.

In any event, the transmitting coil 212 converts the drive signal produced by the drive signal circuit 216 into an alternating magnetic field that emanates beyond the interface surface 214 of the power transmitting device 230. As the alternating magnetic field impinges on the receiving coil 232, the receiving coil 232 produces complementary input alternating waveforms at nodes 280, 284 of the power receiving device 230. Rectifier 234 is coupled across the receiving coil 232 (e.g., across nodes 280, 284), and is configured to rectify the input alternating waveforms. More specifically, rectifier 234 rectifies the input alternating waveforms in order to deliver, at an output of rectifier 234 coupled to node 282, a rectified input waveform (e.g., a pulsed DC or rectified AC waveform). For example, rectifier 234 may be a half-wave or full-wave rectifier (e.g., a bridge rectifier, or another type of rectifier suitable to rectify the input alternating waveform). Reservoir capacitor 242 converts the rectified input waveform into a DC waveform with a relatively small amount of superimposed ripple. The DC waveform may be referred to herein as "power," and that power has a rectified voltage at node 282 that varies based on the strength of the power signal transmitted by the power transmitting device 210.

Regulator 236 is coupled to node 282. Battery charging system 246 and a ground output of rectifier 234 also are coupled to negative input node 286 to provide a ground input to the battery charging system 246.

Regulator 236 provides a regulated output voltage to the load (in this case, the battery charging system 246). According to an embodiment, regulator 236 is a linear regulator, which may include an opamp and a pass transistor, as illustrated in FIG. 2, where an output of the opamp controls the conductivity of the channel of the pass transistor. The opamp may receive a fixed reference voltage 290, which corresponds to a "regulation voltage" (e.g., 5.0 V). The opamp modulates the conductivity of the pass transistor to maintain the voltage at node 288 at the same value as the reference voltage 290. In other alternate embodiments, other types of regulators may be used. In still other alternate embodiments, such as embodiments in which power receiving device 230 is configured to deliver power to one or more lithium ion batteries, regulator 236 and battery charging system 246 may be replaced with a lithium ion charger system configured to produce a regulated output voltage that varies based on temperature and the state of charge of the battery.

According to an embodiment, and as will be described in detail below, power receiving device 230 is configured to monitor the rectified voltage (e.g., at node 282), and to provide feedback to the power transmitting device 210, which indicates whether the power transmitting device 210 should increase or decrease the power signal. More specifically, the feedback is provided by modulating the impedance presented by power receiving device 230 (e.g., to power transmitting device 210). Modulation of the impedance presented by power receiving device 230 is accomplished, according to an embodiment, by coupling and uncoupling loading circuit 260 to the receiving coil 232 at a pre-determined modulation rate. For example, the pre-determined modulation rate may be a single, pre-determined rate (e.g., 1.0 kilohertz (kHz) or some other rate).

According to an embodiment, impedance modulation may be either "on" or "off," and the power transmitting device 210 may detect whether the modulation is "on" or "off," and may respond accordingly, as will be described in more detail later. When impedance modulation is "on," the loading circuit 260 is coupled to and uncoupled from the receiving coil 232 at the pre-determined modulation rate, and when impedance modulation is "off," the loading circuit 260 is not coupled to and uncoupled from the receiving coil 232 at the pre-determined modulation rate. Instead, for example, when impedance modulation is "off," the loading circuit 260 may remain uncoupled from the receiving coil 232 for an extended period of time, so that the impedance presented by the power receiving device 230 does not appear to modulate at the pre-determined modulation rate. Alternatively, when impedance modulation is "off," the loading circuit 260 may remain coupled to the receiving coil 232 for an extended period of time, so that the impedance presented by the power receiving device 230 does not appear to modulate at the pre-determined modulation rate. In other words, regardless of whether the loading circuit 260 is coupled to the receiving coil 232 or not coupled to the receiving coil 232 when modulation is "off," the power receiving device 230 does not present an impedance that is modulating at the pre-determined modulation rate when modulation is "off." However, when modulation is "on," the power receiving device 230 does present an impedance that is modulating at the pre-determined modulation rate.

As indicated above, loading circuit 260 is configured to be selectively coupled to the receiving coil 232, in an embodiment. The power receiving device 230 presents a first load impedance (e.g., to power transmitting device 210) when the loading circuit 260 is uncoupled from the receiving coil 232, and the power receiving device 230 presents a different, second load impedance when the loading circuit 260 is coupled to the receiving coil 232. In order to affect the impedance presented by the power receiving device 230, and according to an embodiment, loading circuit 260 includes one or more impedance affecting components and a switch 264. The one or more impedance affecting components may include, for example, one or more capacitors 262. Alternatively, the impedance affecting components may include any combination of one or more components selected from one or more capacitors, one or more inductors, one or more resistors, one or more diodes, and/or one or more other components that may be used to affect the impedance presented by power receiving device 230.

Switch 264 is used to selectively couple and uncouple the impedance affecting components (e.g., capacitor 262) from receiving coil 232. According to an embodiment, the state of switch 264 (i.e., whether switch 264 is "on" or "closed") is controlled by modulation circuit 248, and modulation circuit 248 determines whether it will cause the loading circuit 260 to be coupled to and uncoupled from the receiving coil 232 at the pre-determined modulation rate (i.e., when impedance modulation is "on"), or whether it will refrain from coupling and uncoupling the loading circuit 260 with the receiving circuit 232 at the pre-determined modulation rate (i.e., when impedance modulation is "off").

According to an embodiment, modulation circuit 248 has a first input coupled to node 282 in order to receive the rectified voltage, and a second input coupled to receive a first threshold voltage 292. For example, the first threshold voltage 292 may be a voltage that is greater than the regulation voltage by a pre-determined amount of "headroom" (or a difference) between the regulation voltage and the first threshold voltage 292. According to an embodiment, the "headroom" is in a range of about 1.0 V to about 3.0 V (e.g., about 2.0 V), although the "headroom" may be larger or smaller, as well. According to another embodiment, the "headroom" is in a range of about 50 percent to about 75 percent of the regulation voltage, although the "headroom" may be larger or smaller, as well. According to a specific embodiment, the regulation voltage may be in a range of about 4.5 V to about 5.5 V, and the first threshold voltage 292 may be in a range of about 5.5 V to about 10 V, although the fixed reference voltage 290 and/or the regulation voltage may be in higher or lower ranges, as well. To clearly describe the concepts of the inventive subject matter, the description below will assume that the system implements a 7.0 V first threshold voltage 292 and a 5.0 V regulation voltage (e.g., the fixed reference voltage 290 equals approximately 5.0 V). In such an embodiment, the "headroom" equals 2.0 V. It should be understood that the first threshold voltage 292 and the regulation voltage may be different.

In any event, according to an embodiment, when modulation circuit 248 determines that the rectified voltage at node 282 and the first threshold voltage 292 have a first inequality relationship, modulation circuit 248 causes loading circuit 260 to be coupled to and uncoupled from the receiving coil 232 at a pre-determined modulation rate (i.e., impedance modulation is "on"). Otherwise, when modulation circuit 248 determines that the rectified voltage at node 282 and the first threshold voltage 292 have a different, second inequality relationship, modulation circuit 248 may refrain from causing the loading circuit 260 to be coupled to and uncoupled from the receiving coil 232 at the pre-determined modulation rate (i.e., impedance modulation is "off"). For example, when modulation circuit 248 determines that the rectified voltage at node 282 exceeds a first threshold voltage 292 of 7.0 V, impedance modulation is "on" as a result of modulation circuit 248 causing loading circuit 260 to be coupled to and uncoupled from the receiving coil 232 at the pre-determined modulation rate. Conversely, when modulation circuit 248 determines that the rectified voltage at node 282 does not exceed the first threshold voltage 292 of 7.0 V, impedance modulation is "off" as a result of modulation circuit 248 refraining from causing loading circuit 260 to be coupled to and uncoupled from the receiving coil 232 at the pre-determined modulation rate.

In the above-described embodiment, the "first inequality relationship" is that the rectified voltage at node 282 is greater than the first threshold voltage 292, and the "second inequality relationship" is that the rectified voltage at node 282 is less than the first threshold voltage 292. In other words, according to an embodiment, impedance modulation is "on" when the rectified voltage at node 282 is greater than the first threshold voltage 292, and impedance modulation is "off" when the rectified voltage at node 282 is less than the first threshold voltage 292.

In addition, in the above-described embodiment, hysteresis with respect to the state of impedance modulation is not implemented in system 200. In other words, the modulation circuit 248 switches impedance modulation "on" when the rectified voltage is at the same threshold voltage that the modulation circuit 248 switches impedance modulation "off" (e.g., modulation circuit 248 switches impedance modulation "on" or "off" based on the relationship of the rectified voltage to a single, first threshold voltage 292). In an alternate embodiment, system 200 may implement hysteresis. In such an embodiment, modulation circuit 248 would switch impedance modulation "on" at a point when the rectified voltage rose above a first threshold voltage, and modulation circuit 248 would switch impedance modulation "off" at a point when the rectified voltage fell below a different, second threshold voltage, where the second threshold voltage would be less than the first threshold voltage. A system that does not implement hysteresis may be considered to have equal first and second threshold voltages.

In an embodiment, modulation circuit 248 includes a comparator 252 and a modulator 250. Comparator 252 includes first and second inputs, coupled respectively to node 282 and to the first threshold voltage 292, and an output coupled to modulator 250. Comparator 252 is configured to compare the rectified voltage at node 282 with the first threshold voltage 292, and to produce a modulation enable signal at the comparator output, which has a value that reflects whether the rectified voltage is greater than or less than the first threshold voltage 292. According to an embodiment, the modulation enable signal has a first level (e.g., a relatively high level) when the rectified voltage is greater than the first threshold voltage 292, and has a second level (e.g., a relatively low level) when the rectified voltage is less than the first threshold voltage 292.

Modulator 250 has an input coupled to comparator 252 and an output coupled to loading circuit 260 (or more specifically to a control gate of transistor 264). Modulator 250 receives the modulation enable signal from comparator 252 at the modulator input, and produces a modulation signal at the modulator output based on the level of the modulation enable signal. When the modulation enable signal has a first level (e.g., when the rectified voltage is greater than the first threshold voltage 292), modulator 250 produces a modulation signal that oscillates between first and second signal levels at the pre-determined modulation rate. Conversely, when the modulation enable signal has a second level (e.g., when the rectified voltage is less than the first threshold voltage 292), modulator 250 refrains from producing an oscillating modulation signal.

Loading circuit 260 is coupled to or not coupled to the receiving coil 232 based on whether the channel of transistor 264 is conductive or non-conductive, and the state of transistor 264 is determined based on the level of the oscillating modulation signal. For example, when the oscillating modulation signal from modulator 250 has a relatively high level, the channel of transistor 264 may be in a conductive state, and the loading circuit 260 (or more specifically capacitor 262, in an embodiment) is coupled to the receiving coil 232. In such a state, power receiving device 230 presents a first load impedance to power transmitting device 210. Conversely, when the oscillating modulation signal from modulator 250 has a relatively low level, the channel of transistor 264 may be in a non-conductive state, and the loading circuit 260 (or more specifically capacitor 262, in an embodiment) is not coupled to the receiving coil 232. In such a state, power receiving device 230 presents a second load impedance to power transmitting device 210. Accordingly, as described above, the load impedance presented by power receiving device 230 to power transmitting device 210 may be controlled to oscillate at the pre-determined modulation rate when the rectified voltage (e.g., at node 282) exceeds a first threshold voltage (e.g., voltage 292). Conversely, the power receiving device 230 may refrain from causing the load impedance presented by power receiving device 230 to oscillate at the pre-determined modulation rate when the rectified voltage does not exceed the first threshold voltage.

According to a further embodiment, the power receiving device 230 also may be configured to provide feedback to power transmitting device 210 (e.g., in the form of an oscillating load impedance) when a temperature of a portion of the power receiving device 230 exceeds a temperature threshold. More specifically, in an embodiment, power receiving device 230 may include one or more temperature sensors 270 coupled to modulation circuit 248. Temperature sensor 270 is configured to detect a temperature within the power receiving device 230, and to provide a control signal to the modulation circuit 248 when the temperature exceeds a temperature threshold, in an embodiment. In response to the over-temperature signal, modulation circuit 248 may produce a modulation signal at its output, which oscillates between first and second signal levels at a second modulation rate (e.g., a pre-determined rate that may be the same as or different from the pre-determined modulation rate discussed above). Accordingly, power receiving device 230 also may present a modulating load impedance when power receiving device 230 is experiencing an over-temperature condition.

Referring again to power transmitting device 210, and as mentioned previously, power transmitting device 210 is configured to detect modulation, at the pre-determined modulation rate, of the load impedance presented by power receiving device 230. In other words, power transmitting device 210 may detect whether the modulation of the load impedance at the pre-determined modulation rate is "on" or "off" in the power receiving device 230. In addition, in an embodiment in which the power receiving device 230 also presents a modulated impedance when experiencing an over-temperature condition, power transmitting device 210 also is configured to detect modulation of the load impedance at the second modulation rate associated with the over-temperature condition.

In an embodiment, power transmitting device 210 senses modulation of the impedance presented by the power receiving device 230 as a modulating current through or voltage across the transmitting coil 212 (referred to herein as the "load current"). For example, according to an embodiment, current sensor 220 may sense the load current through transmitting coil 212, and provide a signal indicating the sensed load current to modulation detector circuit 218. According to an embodiment, current sensor 220 may be positioned to sense a current between tuning capacitor 222 and transmitting coil 212. In other embodiments, the current sensor may be inserted elsewhere to sense the current though transmitting coil 212 (e.g., between transmitting coil 212 and a ground reference, as indicated by dashed current sensor 220'), and/or another type of sensor may be used to detect a current through or voltage across the transmitting coil 212.

Modulation detector circuit 218 is coupled to the transmitting coil (e.g., via current sensor 220) and to the drive signal circuit 216 (via connection 224). Modulation detector circuit 218 is configured to detect modulation of the load impedance, which may be indicated by the load current sensed by current sensor 220, for example. In addition, modulation detector circuit 218 is configured to determine whether the load impedance (or load current) is modulating at the pre-determined modulation rate. When modulation detector circuit 218 determines that the load impedance or load current is modulating at the pre-determined modulation rate, modulation detector circuit 218 communicates a signal to drive signal circuit 216 via connection 224. The signal causes the drive signal circuit 216 to adjust a characteristic of the time-varying drive signal that it provides to transmitter coil 212. More specifically, adjustment of the characteristic of the drive signal results in an adjustment in an intensity of the magnetic field emanating from the transmitting coil 212 (and from the power transmitting device 210). In other words, when modulation detector circuit 218 detects a modulating load impedance or load current at the pre-determined modulation rate, modulation detector circuit 218 causes drive signal circuit 216 to produce a drive signal that results in a different intensity of the power signal. Accordingly, by modulating the load impedance presented by the power receiving device 230, the power receiving device 230 may control the level of power provided by the power transmitting device 210.

In the above-described embodiment, modulation detector circuit 218 is configured to detect modulation of the load impedance by detecting modulation of the load current through the transmitting coil 212. In other embodiments, modulation detector circuit 218 may be configured to detect the modulation of the load impedance by detecting other types of modulation, such as modulation of a relative phase shift of the load current with respect to the time-varying drive signal, modulation of a resonant amplitude of the time-varying drive signal, or modulation of some other measurable electrical signal.

According to an embodiment, when the modulation detector circuit 218 determines that the load impedance is modulating at the pre-determined modulation rate, the modulation detector circuit 218 causes the drive signal circuit 216 to adjust the characteristic of the time-varying drive signal in a manner that causes a decrease the intensity of the magnetic field emanating from the power transmitting device 210 (e.g., to decrease the power signal). The modulation detector circuit 218 causes the drive signal circuit 216 to decrease the power signal in timed increments, in an embodiment. For example, in an embodiment, as long as the modulation detector circuit 218 detects that the load impedance is modulating at the pre-determined modulation rate, the modulation detector circuit 218 may cause the drive signal circuit 216 to adjust the power signal by a first increment upon expiration of each of a series of sequential time periods having a first duration. According to an embodiment, the drive signal circuit 216 may continue incrementally to decrease the intensity of the magnetic field down to a minimum value. For example, upon the expiration of each of a series of sequential 10 millisecond (ms) time periods, the modulation detector circuit 218 may cause the drive signal circuit 216 to produce a power signal that is reduced by 10 percent from its current intensity, down to a minimum value of 10 percent of the maximum intensity of the power signal. In other embodiments, the first time increment may be larger or smaller than 10 ms, the percentage adjustment of the intensity of the power signal may be larger or smaller than 10 percent, and/or the minimum value may be larger or smaller than 10 percent of the maximum intensity of the power signal.

According to a further embodiment, when the modulation detector circuit 218 determines that the load impedance is not modulating at the pre-determined modulation rate, the modulation detector circuit 218 causes the drive signal circuit 216 to adjust the characteristic of the time-varying drive signal in a manner that causes an increase in the intensity of the magnetic field emanating from the power transmitting device 210 (e.g., to increase the power signal). The modulation detector circuit 218 causes the drive signal circuit 216 to increase the power signal in timed increments, in an embodiment. For example, in an embodiment, as long as the modulation detector circuit 218 detects that the load impedance is not modulating at the pre-determined modulation rate, the modulation detector circuit 218 may cause the drive signal circuit 216 to adjust the power signal by a second increment upon expiration of each of a series of sequential time periods having a second duration. The second increment may be the same or different from the first increment, and/or the second duration may be the same or different from the first duration.

According to an embodiment, the drive signal circuit 216 may continue incrementally to increase the intensity of the magnetic field up to a maximum value. For example, upon the expiration of each of a series of sequential 10 millisecond (ms) time periods, the modulation detector circuit 218 may cause the drive signal circuit 216 to produce a power signal that is increased by 10 percent from its current intensity, up to a maximum intensity of the power signal. In other embodiments, the second time increment may be larger or smaller than 10 ms, the percentage adjustment of the intensity of the power signal may be larger or smaller than 10 percent, and/or the maximum value may be smaller than the maximum intensity of the power signal.

In order to adjust the intensity of the magnetic field emanating from the power transmitting device 210 (or the power signal), the drive signal circuit 216 may adjust various characteristics of the time-varying drive signal that it provides to the transmitting coil 212. For example, drive signal circuit 216 may adjust a duty cycle of the time-varying drive signal, a frequency of the drive signal, and/or a voltage level of the time-varying drive signal, among other characteristics.

Figure 3:
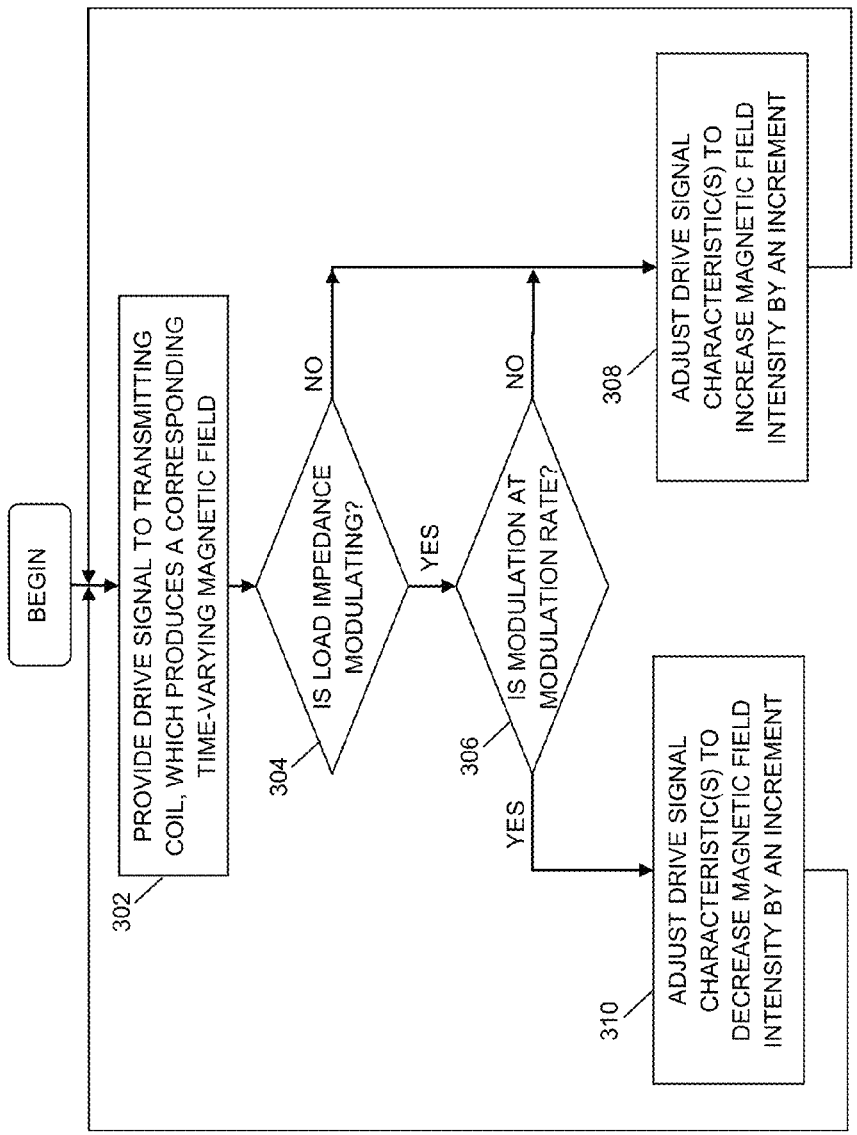
FIG. 3 is a flowchart of a method for a power transmitting device to participate in a wireless charging process, according to an example embodiment.
Figure 4:
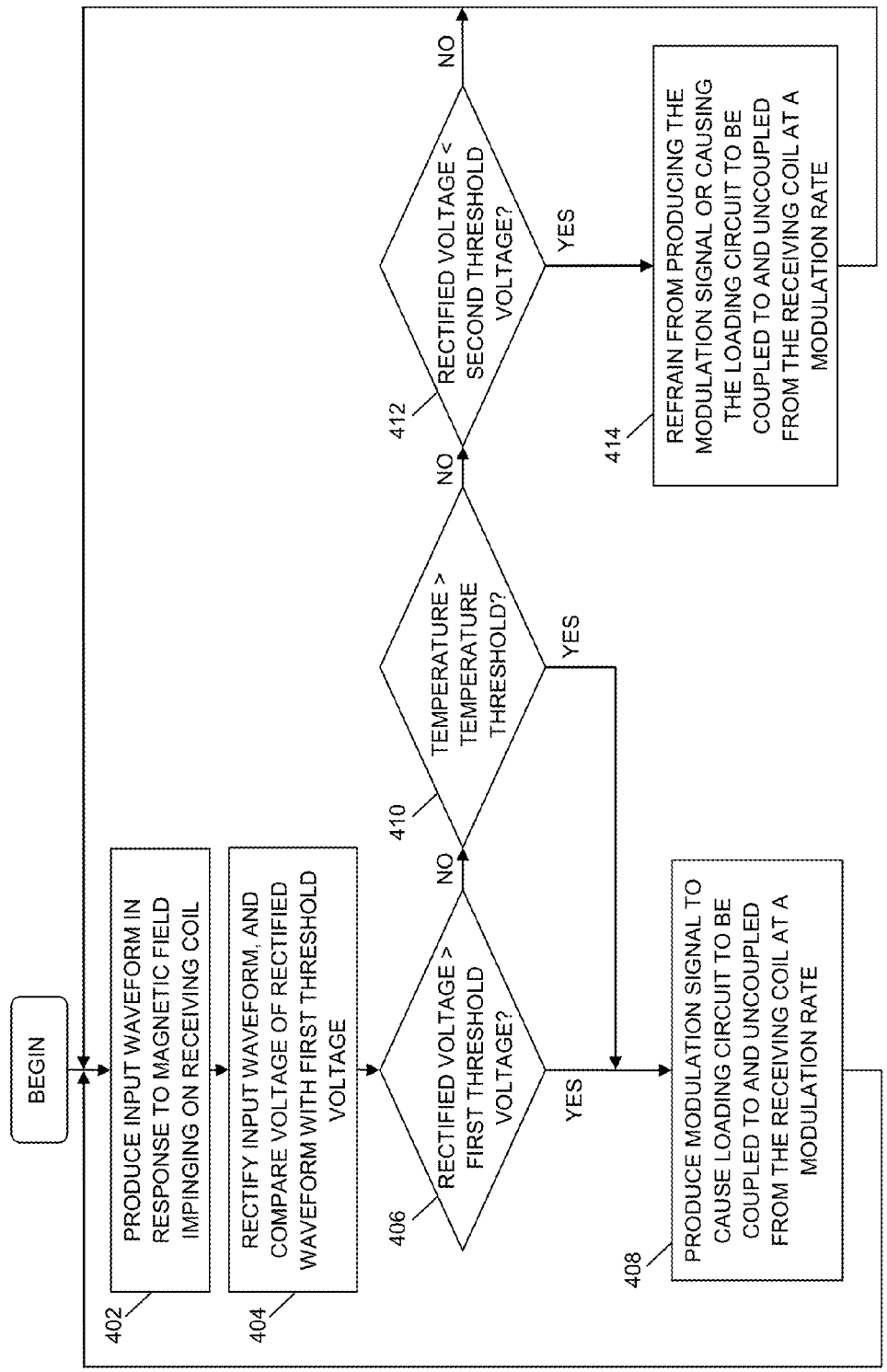
FIG. 4 is a flowchart of a method for a power receiving device to participate in a wireless charging process, according to an example embodiment.

To enhance understanding of some of the various embodiments of power transmitting devices and power receiving devices, embodiments of methods of implementing wireless charging (e.g., in system 200, FIG. 2) will now be described. More particularly, FIGS. 3 and 4 are flowcharts of methods for a power transmitting device (e.g., power transmitting device 210, FIG. 2) and a power receiving device (e.g., power transmitting device 230, FIG. 2), respectively, to participate in a wireless charging process, according to an example embodiment. For purposes of brevity, the method embodiments are not described in great detail below, and it is to be understood that many of the method oriented details discussed above may apply to the method embodiments described below.

FIG. 3 depicts an embodiment of a method for performing wireless charging from the perspective of a power transmitting device (e.g., power transmitting device 110, 210, FIGS. 1, 2). The method may begin, in block 302, by providing (e.g., by drive signal circuit 216, FIG. 2) a drive signal to a transmitting coil (e.g., transmitting coil 212, FIG. 2), which in response produces a corresponding time-varying magnetic field that emanates from the power transmitting device (e.g., from interface surface 214, FIG. 2). Initially, before a load is detected, the power transmitting device may produce a drive signal that causes a magnetic field of a maximum intensity to emanate from the device. In this manner, when a power receiving device initially is brought into close proximity to the power transmitting device, the power transmitting device may transmit maximum power to the power receiving device.

In block 304, the power transmitting device senses the stability of a load impedance (if any) presented by a power receiving device (e.g., power receiving device 230, FIG. 2) that is brought into close enough proximity to the power transmitting device. More particularly, in block 304, the power transmitting device determines (e.g., by modulation detector circuit 218, FIG. 2) whether or not the load impedance is modulating. If so, then the power transmitting device may determine whether or not the load impedance is modulating at a first pre-determined modulation rate, in block 306, in an embodiment, indicating that the power receiving device wants the power transmitting device to decrease the intensity of the power signal. According to a further embodiment, the power transmitting device also may determine whether or not the load impedance is modulating at a second pre-determined rate (e.g., indicating that the power receiving device is experiencing an over-temperature condition).

According to an embodiment, the power receiving device does not cause the load impedance that it presents to modulate at the first pre-determined modulation rate when the rectified voltage (e.g., at node 282, FIG. 2) is less than a first threshold voltage (e.g., first threshold voltage 292, FIG. 2). By refraining from modulating the load impedance at the first pre-determined modulation rate, the power receiving device essentially communicates a request to the power transmitting device to provide more power. Accordingly, when the power receiving device determines that either the load impedance is not modulating (block 304) or a modulating load impedance is not modulating at the pre-determined modulation rate (block 306), the power transmitting device increases the magnetic field intensity (or the level of the power signal) by adjusting one or more characteristics of the drive signal that it provides to the transmitting coil (e.g., transmitting coil 212, FIG. 2). For example, according to an embodiment, as long as the load impedance is not modulating at the pre-determined modulation rate, the power transmitting device may increase the magnetic field intensity, up to a maximum level, by a first increment upon expiration of each of a series of sequential time periods having a first duration.

Conversely, the power receiving device causes the load impedance that it presents to modulate at the pre-determined modulation rate when the rectified voltage (e.g., at node 282, FIG. 2) is greater than a first threshold voltage (e.g., first threshold voltage 292, FIG. 2). By modulating the impedance that it presents at the first pre-determined modulation rate, the power receiving device essentially communicates a request to the power transmitting device to provide less power. Accordingly, when the power receiving device determines that both the load impedance is modulating (block 304) and the load impedance is modulating at the first pre-determined modulation rate (block 306), the power transmitting device decreases the magnetic field intensity (or the level of the power signal) by adjusting one or more characteristics of the drive signal that it provides to the transmitting coil (e.g., transmitting coil 212, FIG. 2). For example, according to an embodiment, as long as the load impedance is modulating at the pre-determined modulation rate, the power transmitting device may decrease the magnetic field intensity, down to a minimum level, by a second increment upon expiration of each of a series of sequential time periods having a second duration. If the power transmitting device determines that the load impedance is modulating at a second pre-determined modulation rate, indicating an over-temperature condition in the power receiving device, the power transmitting device may decrease the magnetic field intensity at a different rate (e.g., more rapidly). Either way, the method may continue by continuously providing a drive signal to the transmitting coil (block 302), determining whether the load impedance is modulating at the pre-determined modulation rate (blocks 304, 306), and either increasing or decreasing the power signal based on that determination (blocks 308, 310).

FIG. 4 depicts an embodiment of a method for performing wireless charging from the perspective of a power receiving device (e.g., power receiving device 130, 230, FIGS. 1, 2). The method may begin, in block 402, by producing an input alternating waveform from an alternating magnetic field impinging on a receiving coil (e.g., receiving coil 232, FIG. 2), where the magnetic field emanates from a source external to the power receiving device (e.g., from power transmitting device 110, 210, FIGS. 1, 2). In block 404, the power receiving device rectifies (e.g., by rectifier 234 and reservoir capacitor 242, FIG. 2) the input waveform to produce a rectified waveform having a rectified voltage. The power receiving device then compares (e.g., by comparator 252, FIG. 2) the rectified voltage with a first threshold voltage (e.g., first threshold voltage 292, FIG. 2).

A determination is made, in block 406, whether the rectified voltage is greater than the first threshold voltage. If so, then in block 408, a modulation signal is produced (e.g., by modulator 250, FIG. 2), which causes a loading circuit (e.g., loading circuit 260, FIG. 2) to be coupled to and uncoupled from the receiving coil at a first pre-determined modulation rate. By modulating the load impedance that the power receiving device presents, the power receiving device may communicate a message to the power transmitting device to reduce the power signal.

When the rectified voltage is not greater than the first threshold voltage, a further determination may be made (e.g., by temperature sensor 270, FIG. 2) whether a temperature within the power receiving device exceeds a temperature threshold in block 410. If so, then in block 408, a modulation signal is produced (e.g., by modulator 250, FIG. 2), which causes the loading circuit (e.g., loading circuit 260, FIG. 2) to be coupled to and uncoupled from the receiving coil at a second pre-determined modulation rate, which may or may not be equal to the first pre-determined modulation rate.

The power receiving device also may determine, in block 412, whether the rectified voltage is less than a second threshold voltage, where the second threshold voltage may be equal to the first threshold voltage (in a system that does not implement hysteresis) or the second threshold voltage may be different from (e.g., lower than) the first threshold voltage (in a system that implements hysteresis). When the rectified voltage is less than the second threshold voltage, then in block 414, the power receiving device refrains from producing the modulation signal or causing the loading circuit to be coupled to and uncoupled from the receiving coil at the pre-determined modulation rate. By refraining from modulating the load impedance that the power receiving device presents, the power receiving device may communicate a message to the power transmitting device to increase the power signal. The method then iterates as shown.

It should be understood that the various method steps illustrated in FIGS. 3 and 4 may be provided in orders other than the example orders illustrated, and/or the methods may include more, fewer, or different steps. In addition, certain steps may be collapsed into a single step, and other single steps may be expanded into multiple steps. In addition, certain ones of the method steps may be performed in parallel, rather than serially. Those of skill in the art would understand how to modify the illustrated flowcharts in manners that produce the same results. Accordingly, such modifications are intended to be included within the scope of the inventive subject matter.

An embodiment of a power receiving device includes a receiving coil, a rectifier, a loading circuit, and a modulation circuit. The receiving coil is configured to produce an input alternating waveform from a received alternating magnetic field emanating from a source external to the power receiving device. The rectifier is coupled to the receiving coil and is configured to rectify the input alternating waveform in order to deliver, at an output of the rectifier, power having a rectified voltage. The loading circuit is configured to be selectively coupled to the receiving coil. The power receiving device presents a first load impedance when the loading circuit is uncoupled from the receiving coil, and the power receiving device presents a different, second load impedance when the loading circuit is coupled to the receiving coil. The modulation circuit is coupled to the output of the rectifier, and the modulation circuit is configured to cause the loading circuit to be coupled to and uncoupled from the receiving coil at a pre-determined modulation rate when the rectified voltage and a first threshold voltage have a first inequality relationship.

An embodiment of a power transmitting device includes a drive signal circuit, a transmitting coil, and a modulation detector circuit. The drive signal circuit is configured to produce a time-varying drive signal. The transmitting coil is coupled to the drive signal circuit, and is configured to receive the time-varying drive signal and to convert the time-varying drive signal into an alternating magnetic field that emanates from the power transmitting device. The modulation detector circuit is coupled to the transmitting coil and to the drive signal circuit. The modulation detector circuit is configured to detect modulation of a load impedance that is magnetically coupled with the transmitting coil, to determine whether the load impedance is modulating at a pre-determined modulation rate, and when the load impedance is modulating at the pre-determined modulation rate, to cause the drive signal circuit to adjust a characteristic of the time-varying drive signal, which results in an adjustment in an intensity of the magnetic field emanating from the power transmitting device.

An embodiment of a wireless charging method is performed by a power receiving device. The method includes producing, by a receiving coil, an input alternating waveform from a received alternating magnetic field emanating from a source external to the power receiving device, rectifying the input alternating waveform in order to deliver power having a rectified voltage, and comparing the rectified voltage with a first threshold voltage. The method also includes causing a loading circuit to be coupled to and uncoupled from the receiving coil at a pre-determined modulation rate when the rectified voltage and a first threshold voltage have a first inequality relationship. The power receiving device presents a first load impedance when the loading circuit is uncoupled from the receiving coil, and the power receiving device presents a different, second load impedance when the loading circuit is coupled to the receiving coil.

Another embodiment of a wireless charging method is performed by a power transmitting device. The method includes providing a time-varying drive signal to a transmitting coil, converting, by the transmitting coil, the time-varying drive signal into an alternating magnetic field that emanates from the power transmitting device, detecting modulation of a load impedance that is magnetically coupled with the transmitting coil, determining whether the load impedance is modulating at a pre-determined modulation rate, and when the load impedance is modulating at the pre-determined modulation rate, adjusting a characteristic of the time-varying drive signal that results in an adjustment in an intensity of the magnetic field that emanates from the power transmitting device.

While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A power receiving device comprising:
    a receiving coil configured to produce an input alternating waveform from a received alternating magnetic field emanating from a source external to the power receiving device;
    a rectifier coupled to the receiving coil and configured to rectify the input alternating waveform in order to deliver, at an output of the rectifier, power having a rectified voltage;
    a loading circuit configured to be selectively coupled to the receiving coil, wherein the power receiving device presents a first load impedance when the loading circuit is uncoupled from the receiving coil, and the power receiving device presents a different, second load impedance when the loading circuit is coupled to the receiving coil; and
    a modulation circuit coupled to the output of the rectifier, wherein the modulation circuit produces a modulation signal at a single pre-determined modulation rate as long as the rectified voltage and a first threshold voltage have a first inequality relationship, and the modulation circuit refrains from producing the modulation signal as long as the rectified voltage and the first threshold voltage do not have the first inequality relationship, and wherein the modulation circuit is configured to cause, based on the modulation signal, the loading circuit to be coupled to and uncoupled from the receiving coil at the single pre-determined modulation rate as long as the rectified voltage and the first threshold voltage have the first inequality relationship.

2. The device of claim 1, wherein the modulation circuit is further configured to compare the rectified voltage with one or more threshold voltages, to cause the loading circuit to be coupled to and uncoupled from the receiving coil at the pre-determined modulation rate when the rectified voltage and the first threshold voltage have the first inequality relationship, and to refrain from causing the loading circuit to be coupled to and uncoupled from the receiving coil at the pre-determined modulation rate when the rectified voltage and a second threshold voltage have a different second inequality relationship, wherein the first and second threshold voltages may be a same voltage or different voltages.

3. The device of claim 1, wherein:
    the loading circuit includes a switch that functions to couple and uncouple impedance affecting components of the loading circuit with the receiving coil in response to the modulation signal.

4. The device of claim 3, wherein the impedance affecting components include one or more components selected from one or more capacitors, one or more inductors, one or more resistors, and one or more diodes.

5. A power receiving device comprising:
    a receiving coil configured to produce an input alternating waveform from a received alternating magnetic field emanating from a source external to the power receiving device;
    a rectifier coupled to the receiving coil and configured to rectify the input alternating waveform in order to deliver, at an output of the rectifier, power having a rectified voltage;
    a loading circuit configured to be selectively coupled to the receiving coil, wherein the power receiving device presents a first load impedance when the loading circuit is uncoupled from the receiving coil, and the power receiving device presents a different, second load impedance when the loading circuit is coupled to the receiving coil; and a modulation circuit coupled to the output of the rectifier, wherein the modulation circuit is configured to cause the loading circuit to be coupled to and uncoupled from the receiving coil at a single pre-determined modulation rate as long as the rectified voltage and a first threshold voltage have a first inequality relationship, wherein a reference voltage equal to the first threshold voltage is provided to the modulation circuit, and wherein the modulation circuit comprises:

a comparator configured to compare the rectified voltage with the first threshold voltage, and to produce a modulation enable signal having a state that reflects whether the rectified voltage is greater than or less than the first threshold voltage, and a modulator configured to produce a modulation signal that oscillates between first and second signal levels at the pre-determined modulation rate when the modulation enable signal indicates that the rectified voltage is greater than the first reference voltage, and to refrain from producing the modulation signal when the modulation enable signal indicates that the rectified voltage is less than the first reference voltage, wherein the loading circuit is coupled to the receiving coil when the modulation signal has the first signal level, and the loading circuit is not coupled to the receiving coil when the modulation signal has the second signal level.

6. The device of claim 5, wherein the power receiving device further comprises:

a voltage regulator coupled to the output of the rectifier, wherein the voltage regulator is configured to regulate the rectified voltage to a regulation voltage at an output node when the regulator is operating in a regulated operational region, and wherein the regulation voltage is less than the first threshold voltage.

7. The device of claim 6, wherein the regulation voltage is in a range of 4.5 volts to 5.5 volts, and the first threshold voltage is in a range of 5.5 volts to 10 volts.

8. The device of claim 6, wherein the power receiving device is a portable device, and the power receiving device further comprises:

a battery charging system, wherein the output terminal is coupled to the battery charging system to provide charge to a battery coupled to the battery charging system.

9. The device of claim 1, wherein the power receiving device further comprises:

a temperature sensor configured to detect a temperature within the power receiving device, and to provide a control signal to the modulation circuit when the temperature exceeds a temperature threshold, and wherein the modulation circuit causes the loading circuit to be coupled to and uncoupled from the receiving coil at a second modulation rate in response to receiving the control signal from the temperature sensor, where the second modulation rate may be the same as or different from the pre-determined modulation rate.

10. The device of claim 1, wherein the power receiving device is a portable device that receives operational power from a battery, and the power receiving device is selected from a hearing aid, wireless headphones, a wireless speaker, a wireless earbud device, an in-ear headphone, a remote control device, a joystick, a wireless keyboard, a wireless cursor control device, a watch, a keyfob, and a portable consumer device.

11. A power transmitting device comprising:

a drive signal circuit configured to produce a time-varying drive signal;

a transmitting coil coupled to the drive signal circuit, and configured to receive the time-varying drive signal and to convert the time-varying drive signal into an alternating magnetic field that emanates from the power transmitting device; and a modulation detector circuit coupled to the transmitting coil and to the drive signal circuit, wherein the modulation detector circuit is configured to detect modulation of a load impedance that is magnetically coupled with the transmitting coil, to determine whether the load impedance is modulating at a single pre-determined modulation rate, and as long as the load impedance is modulating at the pre-determined modulation rate, to cause the drive signal circuit to adjust a characteristic of the time-varying drive signal, which results in an adjustment in an intensity of the magnetic field emanating from the power transmitting device, and wherein, when the load impedance is modulating at the pre-determined modulation rate, the modulation detector circuit is configured to cause the drive signal circuit to adjust the characteristic in a manner that causes a decrease the intensity of the magnetic field emanating from the power transmitting device.

12. The device of claim 11, wherein the modulation detector circuit is configured to detect the modulation of the load impedance by detecting a type of modulation selected from modulation of a load current through the transmitting coil, modulation of a relative phase shift of the load current with respect to the time-varying drive signal, and modulation of a resonant amplitude of the time-varying drive signal.

13. The device of claim 11, wherein, in order to adjust the intensity of the magnetic field, the drive signal circuit adjusts a characteristic of the time-varying drive signal that is selected from a duty cycle of the time-varying drive signal, a frequency of the drive signal, and a voltage level of the time-varying drive signal.

14. The device of claim 11, wherein:

as long as the load impedance is modulating at the pre-determined modulation rate, the modulation detector circuit is configured to cause the drive signal circuit to adjust the characteristic of the time-varying drive signal by an increment upon expiration of each of a series of sequential time periods in order incrementally to decrease the intensity of the magnetic field down to a minimum value.

15. A system comprising:

a power transmitting device, which includes a drive signal circuit configured to produce a time-varying drive signal, a transmitting coil coupled to the drive signal circuit, and configured to receive the time-varying drive signal and to convert the time-varying drive signal into an alternating magnetic field that emanates from the power transmitting device, and a modulation detector circuit coupled to the transmitting coil and to the drive signal circuit, wherein the modulation detector circuit is configured to detect modulation of a load impedance that is magnetically coupled with the transmitting coil, to determine whether the load impedance is modulating at a single pre-determined modulation rate, and as long as the load impedance is modulating at the pre-determined modulation rate, to cause the drive signal circuit to adjust a characteristic of the time-varying drive signal, which results in an adjustment in an intensity of the magnetic field emanating from the power transmitting device; and a power receiving device, which includes a receiving coil configured to produce an input alternating waveform from the alternating magnetic field emanating from the power transmitting device, a rectifier coupled to the receiving coil and configured to rectify the input alternating waveform in order to deliver power at an output of the rectifier, a loading circuit configured to be selectively coupled to the receiving coil, wherein the power receiving device presents a first load impedance when the loading circuit is uncoupled from the receiving coil, and the power receiving device presents a different, second load impedance when the loading circuit is coupled to the receiving coil, and a modulation circuit coupled to the output of the rectifier, wherein the modulation circuit produces a modulation signal at a single pre-determined modulation rate as long as the rectified voltage and a first threshold voltage have a first inequality relationship, and the modulation circuit refrains from producing the modulation signal as long as the rectified voltage and the first threshold voltage do not have the first inequality relationship, and wherein the modulation circuit is configured to cause, based on the modulation signal, the loading circuit to be coupled to and uncoupled from the receiving coil at the single pre-determined modulation rate as long as the rectified voltage and a first threshold voltage have the first inequality relationship.

16. A wireless charging method performed by a power receiving device, the method comprising:

producing, by a receiving coil, an input alternating waveform from a received alternating magnetic field emanating from a source external to the power receiving device;

rectifying the input alternating waveform in order to deliver power having a rectified voltage;

comparing the rectified voltage with a first threshold voltage;

producing a modulation signal that oscillates between first and second signal levels at a single pre-determined modulation rate as long as the rectified voltage and a first threshold voltage have a first inequality relationship;

refraining from producing the modulation signal as long as the rectified voltage and the first threshold voltage do not have the first inequality relationship; and causing, based on the modulation signal, a loading circuit to be coupled to and uncoupled from the receiving coil at the single pre-determined modulation rate as long as the rectified voltage and the first threshold voltage have the first inequality relationship, wherein the power receiving device presents a first load impedance when the loading circuit is uncoupled from the receiving coil, and the power receiving device presents a different, second load impedance when the loading circuit is coupled to the receiving coil.

17. The method of claim 16, further comprising:

comparing the rectified voltage with a second threshold voltage, wherein the first and second threshold voltages may be a same threshold voltage or different threshold voltages; and refraining from causing the loading circuit to be coupled to and uncoupled from the receiving coil at the pre-determined modulation rate when the rectified voltage and the second threshold voltage have a different second inequality relationship.

18. The method of claim 16, wherein:

the loading circuit includes a switch that functions to couple impedance affecting components of the loading circuit to the receiving coil when the modulation signal has the first signal level, and to uncouple the impedance affecting components from the receiving coil when the modulation signal has the second signal level.

19. The method of claim 16, further comprising:

detecting a temperature within the power receiving device;

determining whether the temperature exceeds a temperature threshold; and causing the loading circuit to be coupled to and uncoupled from the receiving coil at a second modulation rate in response to determining that the temperature exceeds the temperature threshold, where the second modulation rate may be the same as or different from the pre-determined modulation rate.

20. The method of claim 16, wherein:

the modulation signal is produced to oscillate between the first and second signal levels at the pre-determined modulation rate when the rectified voltage is greater than the first threshold voltage; and refraining from producing the modulation signal is performed when the rectified voltage is less than the first threshold voltage.

21. A wireless charging method performed by a power transmitting device, the method comprising:

providing a time-varying drive signal to a transmitting coil;

converting, by the transmitting coil, the time-varying drive signal into an alternating magnetic field that emanates from the power transmitting device;

detecting modulation of a load impedance that is magnetically coupled with the transmitting coil;

determining whether the load impedance is modulating at a single pre-determined modulation rate; and as long as the load impedance is modulating at the single pre-determined modulation rate, adjusting a characteristic of the time-varying drive signal that results in an adjustment in an intensity of the magnetic field that emanates from the power transmitting device, wherein, when the load impedance is modulating at the pre-determined modulation rate, adjusting the characteristic of the time-varying drive signal comprises adjusting the characteristic in a manner that causes a decrease in the intensity of the magnetic field emanating from the power transmitting device.

22. The method of claim 21, wherein detecting modulation of the load impedance comprises detecting a type of modulation selected from modulation of a load current through the transmitting coil, modulation of a relative phase shift of the load current with respect to the time-varying drive signal, and modulation of a resonant amplitude of the time-varying drive signal.

23. The method of claim 21, wherein adjusting the characteristic of the time-varying drive signal comprises adjusting a characteristic of the time-varying drive signal that is selected from a duty cycle of the time-varying drive signal, a frequency of the drive signal, and a voltage level of the time-varying drive signal.

24. The method of claim 21, wherein as long as the load impedance is modulating at the pre-determined modulation rate, adjusting the characteristic of the time-varying drive signal comprises adjusting the characteristic by an increment upon expiration of each of a series of sequential time periods in order incrementally to decrease the intensity of the magnetic field emanating from the power transmitting device down to a minimum value.

* * * * *